US011336352B2

(12) United States Patent
Sun et al.

(10) Patent No.: US 11,336,352 B2
(45) Date of Patent: May 17, 2022

(54) CHANNEL STATE INFORMATION REFERENCE SIGNAL FOR WIDEBAND OPERATION

(71) Applicant: QUALCOMM Incorporated, San Diego, CA (US)

(72) Inventors: Jing Sun, San Diego, CA (US); Ananta Narayanan Thyagarajan, Bangalore (IN); Kapil Bhattad, Bangalore (IN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/946,901

(22) Filed: Jul. 10, 2020

(65) Prior Publication Data

US 2021/0021314 A1 Jan. 21, 2021

(30) Foreign Application Priority Data

Jul. 15, 2019 (IN) .............................. 201941028335

(51) Int. Cl.
*H04W 4/00* (2018.01)
*H04B 7/06* (2006.01)
(Continued)

(52) U.S. Cl.
CPC ......... *H04B 7/0626* (2013.01); *H04L 1/0013* (2013.01); *H04L 5/0051* (2013.01); *H04W 74/0808* (2013.01)

(58) Field of Classification Search
CPC ..... H04B 7/0626; H04L 1/0013; H04L 5/005; H04L 5/0007; H04L 5/0096; H04W 74/0808; H04W 72/042
(Continued)

(56) References Cited

U.S. PATENT DOCUMENTS 10,211,964 B2 * 2/2019 Onggosanusi .... H04W 72/0413
10,624,108 B2 * 4/2020 Manolakos ........... H04L 5/0062
(Continued)

FOREIGN PATENT DOCUMENTS

WO WO-2018209596 A1 11/2018
WO WO-2019057073 A1 3/2019

OTHER PUBLICATIONS

Interdigital, Inc: "DL Signals and Channels for gNB Initiated COT", 3GPP Draft, R1-1904851, 3GPP TSG RAN WG1 #96bis, DL Signals and Channels for gNB Initiated COT, 3rd Generation Partnership Project (3GPP), Mobile Competence Centre, 650, Route Des Lucioles, F-06921, Sophia-Antipolis, Cedex, France, vol. RAN WG1, No. Xi'an, China, Apr. 8, 2019-Apr. 12, 2019, Apr. 7, 2019 (Apr. 7, 2019), XP051699998, 6 Pages, Retrieved from the Internet: URL:http://www.3gpp.org/ftp/Meetings%5F3GPP%5FSYNC/RAN1/Docs/R1%2D1904851%2Ezip [retrieved on Apr. 7, 2019], Section 2.

(Continued)

*Primary Examiner* — Amancio Gonzalez
(74) *Attorney, Agent, or Firm* — Harrity & Harrity, LLP \ Qualcomm

(57) ABSTRACT

This disclosure provides systems, methods, and apparatuses for determining whether a channel state information reference signal (CSI-RS) is to be transmitted, and a configuration for transmission of the CSI-RS on a wideband based on an outcome of a listen-before-talk (LBT) operation in multiple sub-bands of the wideband. In one aspect, a base station may transmit sub-band usage information indicating sub-band availability before the CSI-RS, thereby allowing a user equipment (UE) to determine whether the CSI-RS will be transmitted and, if so, on which sub-bands the CSI-RS will be transmitted. Furthermore, rate matching configurations are provided based on whether sub-band usage has been received, based on which sub-bands are available. Still (Continued)

further, power configurations and resource element selection criteria are provided for wideband CSI-RS and CSI feedback.

34 Claims, 9 Drawing Sheets

(51) Int. Cl.
  *H04W 74/08* (2009.01)
  *H04L 1/00* (2006.01)
  *H04L 5/00* (2006.01)

(58) Field of Classification Search
  USPC .......................... 370/329, 310.2; 455/450.1
  See application file for complete search history.

(56) References Cited

U.S. PATENT DOCUMENTS

| | | | | |
|---|---|---|---|---|
| 10,932,276 | B2* | 2/2021 | Iyer | H04B 7/06 |
| 11,139,939 | B2* | 10/2021 | Gupta | H04L 5/0048 |
| 2010/0202372 | A1* | 8/2010 | Chun | H04L 5/0057 |
| | | | | 370/329 |
| 2015/0049702 | A1* | 2/2015 | Cheng | H04B 7/024 |
| | | | | 370/329 |
| 2016/0149629 | A1* | 5/2016 | Zhang | H04L 1/0027 |
| | | | | 370/329 |
| 2018/0034612 | A1* | 2/2018 | Lin | H04B 17/345 |
| 2018/0278390 | A1* | 9/2018 | Yakada | H04L 5/0055 |
| 2019/0089437 | A1* | 3/2019 | Chen | H04B 7/0617 |
| 2019/0149306 | A1 | 5/2019 | Gao et al. | |
| 2019/0182007 | A1* | 6/2019 | Liu | H04L 5/003 |
| 2020/0083938 | A1* | 3/2020 | Park | H04B 7/0639 |
| 2020/0221325 | A1 | 7/2020 | Zheng et al. | |
| 2020/0313807 | A1* | 10/2020 | Salem | H04L 1/1864 |
| 2020/0351011 | A1* | 11/2020 | Mukherjee | H04L 5/0048 |

OTHER PUBLICATIONS

International Search Report and Written Opinion—PCT/US2020/070262—ISA/EPO—dated Dec. 10, 2020.
Partial International Search Report—PCT/US2020/070262—ISA/EPO—dated Oct. 19, 2020.
Qualcomm Incorporated: "DL Signals and Channels for NR-U", 3GPP Draft, R1-1912936, 3GPP TSG RAN WG1 Meeting #98bis, 3rd Generation Partnership Project (3GPP), Mobile Competence Centre, 650, Route Des Lucioles, F-06921, Sophia-Antipolis, Cedex, France, vol. RAN WG1, No. Reno, Nevada, US, Nov. 18, 2019-Nov. 22, 2019, Nov. 9, 2019 (Nov. 9, 2019), XP051823699, pp. 1-16, Retrieved from the Internet: URL:https://ftp.3gpp.org/tsg_ran/WG1_RL1/TSGR1_99/Docs/R1-1912936.zip [retrieved on Nov. 9, 2019], Sections 5-8.

* cited by examiner

CHANNEL STATE INFORMATION REFERENCE SIGNAL FOR WIDEBAND OPERATION

CROSS-REFERENCE TO RELATED APPLICATION

This Patent Application claims priority to Indian Patent Application No. 201941028335, filed on Jul. 15, 2019, entitled "CHANNEL STATE INFORMATION REFERENCE SIGNAL FOR WIDEBAND OPERATION," and assigned to the assignee hereof. The disclosure of the prior Application is considered part of and is incorporated by reference into this Patent Application.

TECHNICAL FIELD

Aspects of the present disclosure relate generally to wireless communication and to techniques for a channel state information (CSI) reference signal (RS) for wideband operation in an unlicensed spectrum.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, a 5G NodeB, or further examples.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by a user equipment (UE). The method may include receiving configuration information for a channel state information reference signal (CSI-RS), where the configuration information indicates that the CSI-RS is configured on a plurality of sub-bands of a wideband structure; selectively receiving the CSI-RS based on the configuration information and based on a sub-band valid indication associated with the plurality of sub-bands; and if the CSI-RS is received, transmitting channel state information (CSI) feedback based on the configuration information.

In some implementations, the method may include receiving downlink control information indicating the sub-band valid indication.

In some implementations, when all sub-bands of the plurality of sub-bands are available for the CSI-RS, the CSI-RS is received, and when at least one sub-band of the plurality of sub-bands is not available for the CSI-RS, the CSI-RS is not received.

In some implementations, the method may include rate matching a shared channel around a resource of the CSI-RS irrespective of whether the CSI-RS is received.

In some implementations, the method may include performing a processing operation associated with the CSI-RS with respect to the plurality of sub-bands irrespective of whether the CSI-RS is received.

In some implementations, the method may include determining that the CSI-RS is to be received based on sub-band usage information received before a resource associated with the CSI-RS; and performing a processing operation associated with the CSI-RS with respect to the plurality of sub-bands based on determining that the CSI-RS is to be received.

In some implementations, the CSI-RS is received on a subset of sub-bands of the plurality of sub-bands based on the subset of sub-bands being available for the CSI-RS.

In some implementations, a sequence for the CSI-RS for the plurality of sub-bands is punctured to generate the CSI-RS for the subset of sub-bands.

In some implementations, the CSI-RS for the subset of sub-bands is generated based on a shortened sequence relative to a sequence for the CSI-RS for the plurality of sub-bands.

In some implementations, the method may include receiving a trigger for the CSI feedback based on all sub-bands, of the plurality of sub-bands, being available for the CSI-RS.

In some implementations, when the CSI-RS is received on a subset of sub-bands, of the plurality of sub-bands, the CSI-RS is received on resource elements on the subset of sub-bands that correspond to a widest bandwidth of the wideband structure.

In some implementations, the CSI-RS is generated based on a same sequence with respect to the widest bandwidth and with respect to the subset of sub-bands.

In some implementations, the CSI-RS spans 48 resource blocks in a sub-band of the subset of sub-bands.

In some implementations, the resource elements intersect with resource elements of the wideband structure.

In some implementations, the method may include receiving a trigger for the CSI feedback after a COT-SI indicating a subset of sub-bands, of the plurality of sub-bands, that are available for the CSI-RS.

In some implementations, the CSI-RS is for periodic or semi-persistent CSI feedback.

In some implementations, the CSI-RS is for aperiodic CSI feedback.

In some implementations, the method may include rate matching a shared channel around a resource of the CSI-RS based on the plurality of sub-bands being available for the CSI-RS.

In some implementations, the method may include selectively receiving the CSI-RS based on at least one of: a COT-SI received before a resource of the CSI-RS, a signal-to-noise ratio associated with a resource of the CSI-RS, or a value associated with a grant for a shared channel.

In some implementations, the method may include performing a processing operation associated with the CSI-RS with respect to the plurality of sub-bands based on a COT-SI received after the CSI-RS is received.

In some implementations, the method may include performing a per-sub-band processing operation associated with the CSI-RS to determine per-sub-band CSI feedback; and identifying a subset of sub-bands, of the plurality of sub-bands, on which the CSI-RS is received, where the CSI feedback is based on the per-sub-band CSI feedback associated with the subset of sub-bands.

In some implementations, the method may include receiving a grant for a subset of sub-bands of the plurality of sub-bands; and rate matching a shared channel associated with the grant around a resource associated with the CSI-RS on the subset of sub-bands.

In some implementations, the method may include receiving a grant for a subset of sub-bands of the plurality of sub-bands; and rate matching a shared channel associated with the grant around a resource associated with the CSI-RS on the subset of sub-bands based on a COT-SI being received before the CSI-RS, where the COT-SI indicates that the subset of sub-bands are available.

In some implementations, the CSI-RS is received on a subset of sub-bands.

In some implementations, the configuration information includes configurations for multiple different subsets of sub-bands of the plurality of sub-bands.

In some implementations, the method may include receiving a trigger associated with a configuration for a particular subset of sub-bands, of the multiple different subsets of sub-bands, based on the particular subset of sub-bands being available for the CSI-RS.

In some implementations, the method may include receiving a trigger that indicates a particular subset of sub-bands, of the multiple different subsets of sub-bands, based on the particular subset of sub-bands being available for the CSI-RS.

In some implementations, a power level of the CSI-RS, per resource element or per sub-band, is independent of a number of sub-bands on which the CSI-RS is transmitted.

In some implementations, a power level of the CSI-RS, per resource element or per sub-band, is based on a number or configuration of sub-bands on which the CSI-RS is transmitted.

In some implementations, a power level of the CSI-RS is based on whether the CSI-RS is aperiodic, periodic, or semi-persistent.

In some implementations, the method may include determining a power level of the CSI-RS based on at least one of: a number or configuration of sub-bands on which the CSI-RS is transmitted, or information indicating the power level of the CSI-RS.

Another innovative aspect of the subject matter described in this disclosure can be implemented in an apparatus of a UE for wireless communication. The apparatus may include a first interface configured to: obtain configuration information for a CSI-RS, where the configuration information indicates that the CSI-RS is configured on a plurality of sub-bands of a wideband structure; and selectively obtain the CSI-RS based on the configuration information and based on a sub-band valid indication associated with the plurality of sub-bands; and a second interface configured to transmit, if the CSI-RS is obtained, CSI feedback based on the configuration information.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive configuration information for a CSI-RS, where the configuration information indicates that the CSI-RS is configured on a plurality of sub-bands of a wideband structure; selectively transmit the CSI-RS based on the configuration information and based on a sub-band valid indication associated with the plurality of sub-bands; and if the CSI-RS is received, transmit CSI feedback based on the configuration information.

Another innovative aspect of the subject matter described in this disclosure can be implemented in an apparatus for wireless communication. The apparatus may include means for transmitting configuration information for a CSI-RS, where the configuration information indicates that the CSI-RS is configured on a plurality of sub-bands of a wideband structure; and means for selectively transmitting the CSI-RS based on the configuration information and based on a sub-band valid indication associated with the plurality of sub-bands; and means for transmitting, if the CSI-RS is received, CSI feedback based on the configuration information.

Another innovative aspect of the subject matter described in this disclosure can be implemented in a method of wireless communication performed by an apparatus of a base station (BS). The method may include transmitting configuration information for a CSI-RS, where the configuration information indicates a plurality of sub-bands of a wideband structure for the CSI-RS; performing a listen-before-talk (LBT) operation to identify a subset of sub-bands, of the plurality of sub-bands, that are available for the CSI-RS, where the subset of sub-bands includes up to all sub-bands of the plurality of sub-bands; and selectively transmitting the CSI-RS based on a result of the LBT operation.

In some implementations, when all sub-bands of the plurality of sub-bands are available for the CSI-RS, the CSI-RS is transmitted, and when at least one sub-band of the plurality of sub-bands is not available for the CSI-RS, the CSI-RS is not transmitted.

In some implementations, the method may include rate matching a shared channel around a resource of the CSI-RS irrespective of whether the CSI-RS is transmitted.

In some implementations, the subset of sub-bands includes less than all sub-bands of the plurality of sub-bands.

In some implementations, a sequence for the CSI-RS for the plurality of sub-bands is punctured to generate the CSI-RS for the subset of sub-bands.

In some implementations, the CSI-RS for the subset of sub-bands is generated based on a shortened sequence, relative to a sequence for the CSI-RS for the plurality of sub-bands.

In some implementations, the method may include transmitting a trigger for CSI feedback associated with the CSI-RS based on all sub-bands, of the plurality of sub-bands, being available for the CSI-RS.

In some implementations, when the CSI-RS is transmitted on the subset of sub-bands of the plurality of sub-bands, the CSI-RS is transmitted on resource elements on the subset of sub-bands that correspond to a widest bandwidth of the wideband structure.

In some implementations, the CSI-RS is based on a same sequence with respect to the widest bandwidth and with respect to the subset of sub-bands.

In some implementations, the CSI-RS spans 48 resource blocks in a sub-band of the subset of sub-bands.

In some implementations, the resource elements intersect with resource elements of the wideband structure.

In some implementations, the CSI-RS is for periodic or semi-persistent CSI feedback.

In some implementations, the CSI-RS is for aperiodic CSI feedback.

In some implementations, the method may include rate matching a shared channel around a resource of the CSI-RS based on the plurality of sub-bands being available for the CSI-RS.

In some implementations, the method may include transmitting sub-band usage information identifying the subset of sub-bands, where the sub-band usage information identifying the subset of sub-bands is associated with at least one of: a COT-SI transmitted before a resource of the CSI-RS, a value associated with a grant for a shared channel, or downlink control information that indicates the subset of sub-bands.

In some implementations, the method may include transmitting a grant for the subset of sub-bands; and rate matching a shared channel associated with the grant around a resource associated with the CSI-RS on the subset of sub-bands.

In some implementations, the method may include transmitting a grant for the subset of sub-bands; transmitting a COT-SI before the CSI-RS; and rate matching a shared channel associated with the grant around a resource associated with the CSI-RS on the subset of sub-bands based on the COT-SI being transmitted before the CSI-RS.

In some implementations, the method may include transmitting a trigger for CSI feedback associated with the CSI-RS after a COT-SI indicating the subset of sub-bands, of the plurality of sub-bands, that are available for the CSI-RS.

In some implementations, the configuration information includes configurations for multiple different subsets of sub-bands of the plurality of sub-bands.

In some implementations, the method may include transmitting a trigger associated with a configuration for a particular subset of sub-bands, of the multiple different subsets of sub-bands, based on the particular subset of sub-bands being available for the CSI-RS.

In some implementations, the method may include transmitting a trigger that indicates a particular subset of sub-bands, of the multiple different subsets of sub-bands, based on the particular subset of sub-bands being available for the CSI-RS.

In some implementations, a power level of the CSI-RS, per resource element or per sub-band, is independent of a number of sub-bands on which the CSI-RS is transmitted.

In some implementations, a power level of the CSI-RS, per resource element or per sub-band, is based on a number or configuration of sub-bands on which the CSI-RS is transmitted.

In some implementations, a power level of the CSI-RS, per resource element or per sub-band, is based on whether the CSI-RS is aperiodic, periodic, or semi-persistent.

In some implementations, the method may include determining a power level of the CSI-RS based on at least one of: a number or configuration of sub-bands on which the CSI-RS is transmitted, or information indicating the power level of the CSI-RS.

In some implementations, the CSI-RS is transmitted when a COT-SI associated with the CSI-RS can be transmitted before the CSI-RS, and where the CSI-RS is not transmitted when the COT-SI associated with the CSI-RS cannot be transmitted before the CSI-RS.

Another innovative aspect of the subject matter described in this disclosure can be implemented in an apparatus of a BS for wireless communication. The apparatus may include a first interface configured to: output configuration information for a CSI-RS, where the configuration information indicates a plurality of sub-bands of a wideband structure for the CSI-RS; and a processing system configured to: perform a listen-before-talk (LBT) operation to identify a subset of sub-bands, of the plurality of sub-bands, that are available for the CSI-RS, where the subset of sub-bands includes up to all sub-bands of the plurality of sub-bands, where the first interface is further configured to: selectively output the CSI-RS based on a result of the LBT operation.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a BS, may cause the one or more processors to transmit configuration information for a CSI-RS, where the configuration information indicates a plurality of sub-bands of a wideband structure for the CSI-RS; perform a listen-before-talk (LBT) operation to identify a subset of sub-bands, of the plurality of sub-bands, that are available for the CSI-RS, where the subset of sub-bands includes up to all sub-bands of the plurality of sub-bands; selectively transmit the CSI-RS based on a result of the LBT operation.

Another innovative aspect of the subject matter described in this disclosure can be implemented in an apparatus for wireless communication. The apparatus may include means for transmitting configuration information for a CSI-RS, where the configuration information indicates a plurality of sub-bands of a wideband structure for the CSI-RS; means for performing a listen-before-talk (LBT) operation to identify a subset of sub-bands, of the plurality of sub-bands, that are available for the CSI-RS, where the subset of sub-bands includes up to all sub-bands of the plurality of sub-bands; and means for selectively transmitting the CSI-RS based on a result of the LBT operation.

Aspects generally include a method, apparatus, system, computer program product, non-transitory computer-readable medium, user equipment, base station, wireless communication device, or processing system as substantially described with reference to and as illustrated by the drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
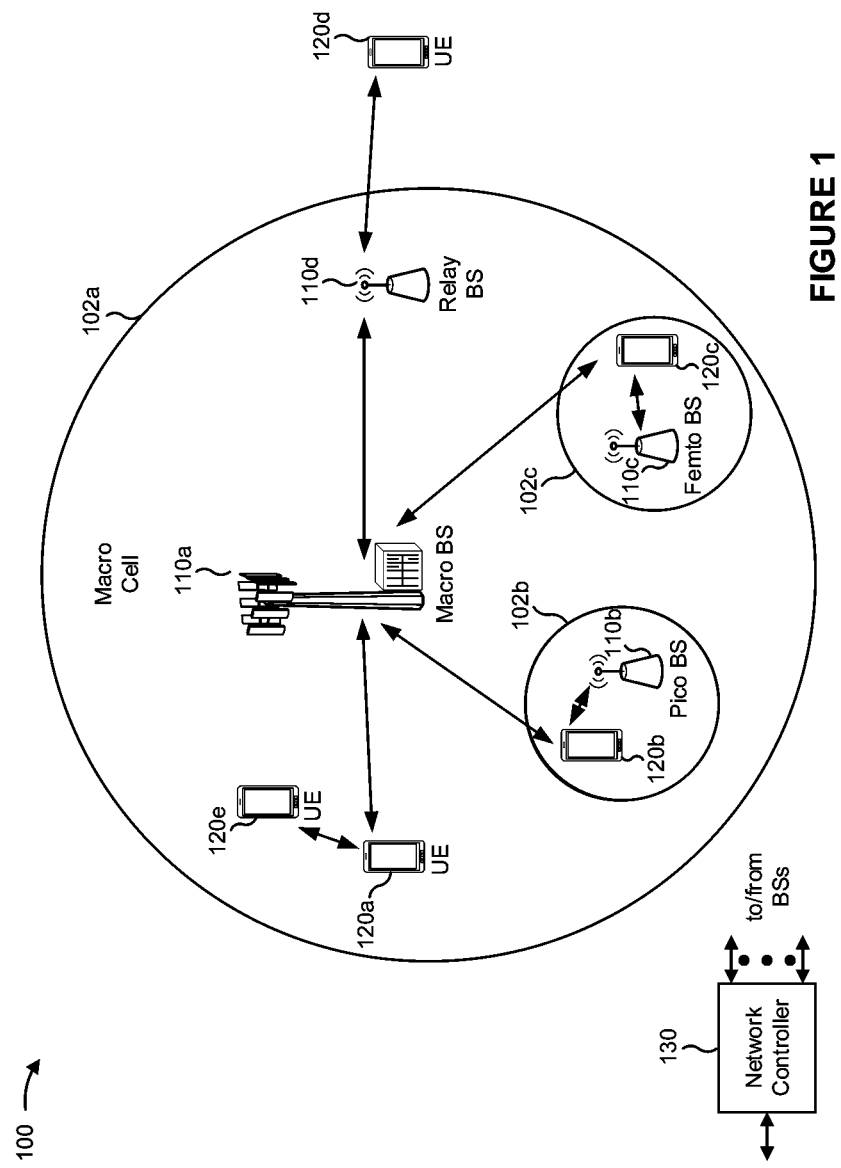
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Some radio access technologies (RATs), such as NR, may allow operation in unlicensed spectrum. The NR RAT for the unlicensed spectrum may be referred to as NR-Unlicensed (NR-U or NRU). Some RATs may support different bandwidths for sub-bands or combinations of sub-bands, such as 20 MHz, 40 MHz, 60 MHz, 80 MHz, or further examples. For example, multiple sub-bands of 20 MHz may be combined to form a larger bandwidth, referred to as a wideband. The combination of multiple sub-bands may be referred to herein as a wideband structure. A wideband structure may be a bandwidth part of the UE (that is, a configured bandwidth of the UE within which the UE may communicate on one or more sub-bands).

If a UE is configured with multiple sub-bands in the unlicensed spectrum, not all sub-bands may be available at all times. For example, some sub-bands may be occupied by other UEs, base stations, wireless nodes, or further examples. A base station or a UE may perform a listen-before-talk (LBT) operation to determine whether one or more sub-bands are available for a communication. In an LBT operation, a base station or UE may listen to a channel or a sub-band for a length of time, then may transmit an indication that the base station or UE has reserved the channel or the sub-band for a time window if no other reservation for the channel or the sub-band is received while the base station or UE is listening or if interference on the channel or the sub-band satisfies a threshold. Thus, coexistence between devices on non-centrally-scheduled channels, such as sidelink channels on the unlicensed spectrum, is enabled.

A base station may use channel state information (CSI) feedback to determine channel conditions for a channel between the base station and a UE. For example, the base station may transmit a CSI-RS to one or more UEs with certain characteristics that may be available to or determinable by the UE. Using the CSI-RS, the UE may determine CSI feedback, such as a CSI report, that indicates the channel conditions between the base station and the UE. However, in the case of unlicensed spectrum with a wideband structure, not all sub-bands configured for the CSI-RS may be available when the CSI-RS is to be transmitted. Furthermore, the UE may or may not have received information indicating which sub-bands are available at the time the CSI-RS is to be transmitted (since this information may sometimes come after the CSI-RS). Certain operations, such as rate matching around the CSI-RS and transmission or processing of the CSI-RS itself, may be hampered by this uncertainty.

Techniques and apparatuses described herein provide for the determination of whether a CSI-RS is to be transmitted, and a configuration for transmission of the CSI-RS on a wideband structure based on a result of an LBT operation regarding sub-bands of the wideband structure. For example, some techniques and apparatuses described herein provide for signaling of sub-band usage information indicating which sub-bands are available before the CSI-RS is transmitted, thus allowing the UE to determine whether the CSI-RS will be transmitted and, if so, on which sub-bands. Furthermore, some techniques and apparatuses described herein provide rate matching configurations based on whether sub-band usage has been received, based on which sub-bands are available, or further examples. Still further, some techniques and apparatuses described herein provide power configurations and resource element selection criteria for wideband CSI-RS and CSI feedback.

Particular implementations of the subject matter described in this disclosure can be implemented to realize one or more of the following potential advantages. By determining which sub-bands will contain a CSI-RS, and by determining power configurations of the CSI-RS, usage of CSI-RS on the wideband may be improved. Some implementations may improve resource utilization by providing rate matching configurations that are sub-band-specific, rather than an "all-or-nothing" approach where the CSI-RS is rate matched across the entire wideband or not at all. Some implementations may reduce complexity by providing an all-or-nothing approach for rate-matching the CSI-RS. Furthermore, some implementations may improve resource utilization by ensuring that sub-band usage information is provided to the UE before the CSI-RS, which may reduce uncertainty in unlicensed bands and may conserve UE resources that might otherwise be used to process a nonexistent CSI-RS. This may ensure that the UE estimates and reports an accurate channel estimate/channel quality indication to the base station, so the base station can configure the DL/UL communication parameters and resources (such as the modulation scheme, coding rate, spatial multiplexing/diversity, and so on). For example, if the UE were to wrongly assume the presence of a CSI-RS in a sub-band, the UE may transmit an erroneous CSI feedback/report, which may lead to the BS configuring communication parameters which are sub-optimal and which result in degraded performance.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, a transmit receive point (TRP), or further examples. Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 watts) whereas pico BSs, femto BSs, and relay BSs may have lower transmit power levels (for example, 0.1 to 2 watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
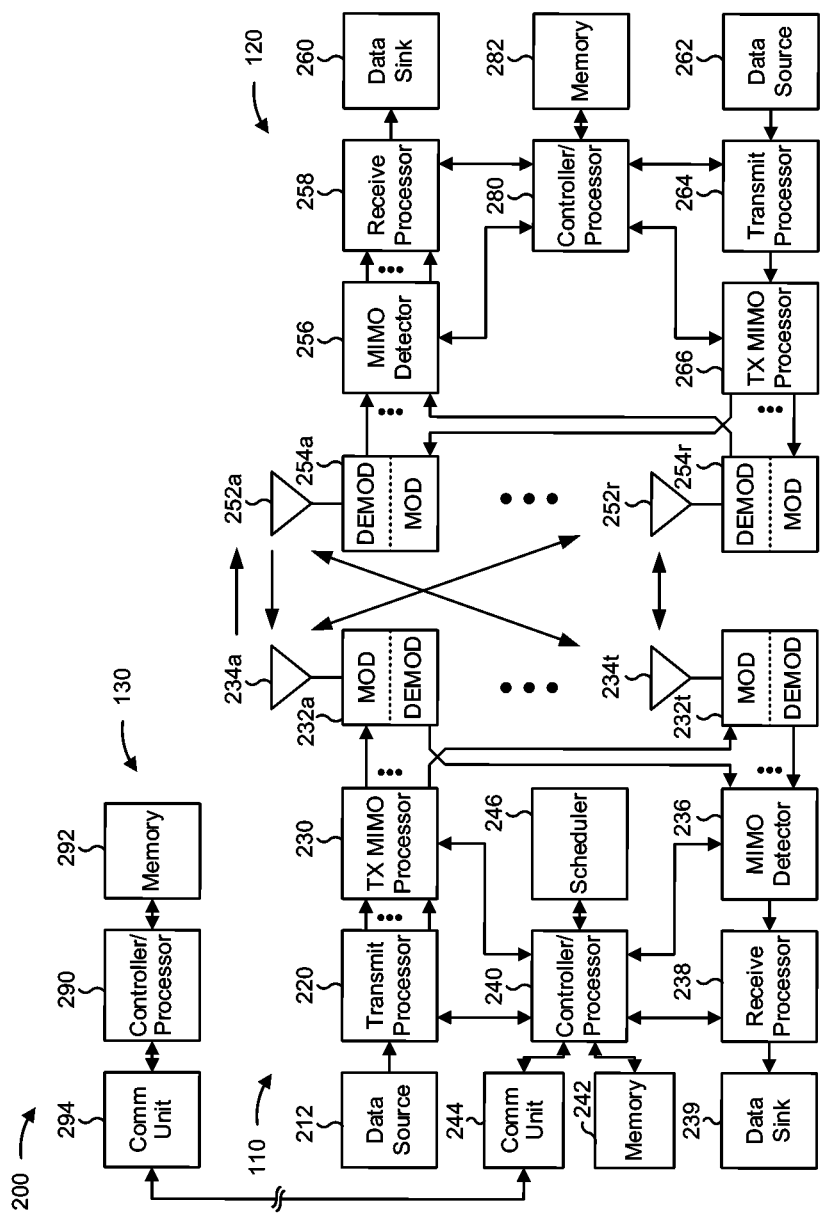
FIG. 2 is a block diagram conceptually illustrating an example of a base station (BS) in communication with a user equipment (UE) in a wireless network.

FIG. 2 is a block diagram conceptually illustrating an example 200 of a base station (BS) in communication with a user equipment (UE) 120 in a wireless network. In some aspects, base station 110 and UE 120 may respectively be one of the base stations and one of the UEs in wireless network 100 of FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 or other base stations and may provide received signals to demodulators (DEMODs) 254*a* through 254*r*, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254*a* through 254*r* (for example, for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The base station 110 may include communication unit 244 and communicate to network controller 130 via communication unit 244. The network controller 130 may include communication unit 294, a controller or processor (i.e., controller/processor) 290, and memory 292.

In some implementations, controller/processor 280 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, controller/processor 240 may be a component of a processing system. A processing system may generally refer to a system or series of machines or components that receives inputs and processes the inputs to produce a set of outputs (which may be passed to other systems or components of, for example, the BS 110). For example, a processing system of the BS 110 may refer to a system including the various other components or subcomponents of the BS 110.

The processing system of the BS 110 may interface with other components of the BS 110, and may process information received from other components (such as inputs or signals), output information to other components, etc. For example, a chip or modem of the BS 110 may include a processing system, a first interface to receive or obtain information, and a second interface to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

The controller/processor 240 of base station 110, the controller/processor 280 of UE 120, or any other component(s) of FIG. 2 may perform one or more techniques associated with a CSI-RS for wideband operation, as described in more detail elsewhere herein. For example, the controller/processor 240 of base station 110, the controller/processor 280 of UE 120, or any other component(s) (or combinations of components) of FIG. 2 may perform or direct operations of, for example, the process 800 of FIG. 8, the process 900 of FIG. 9, or other processes as described herein. The memories 242 and 282 may store data and program codes for base station 110 and UE 120, respectively. A scheduler 246 may schedule UEs for data transmission on the downlink, the uplink, or a combination thereof.

Figure 8:
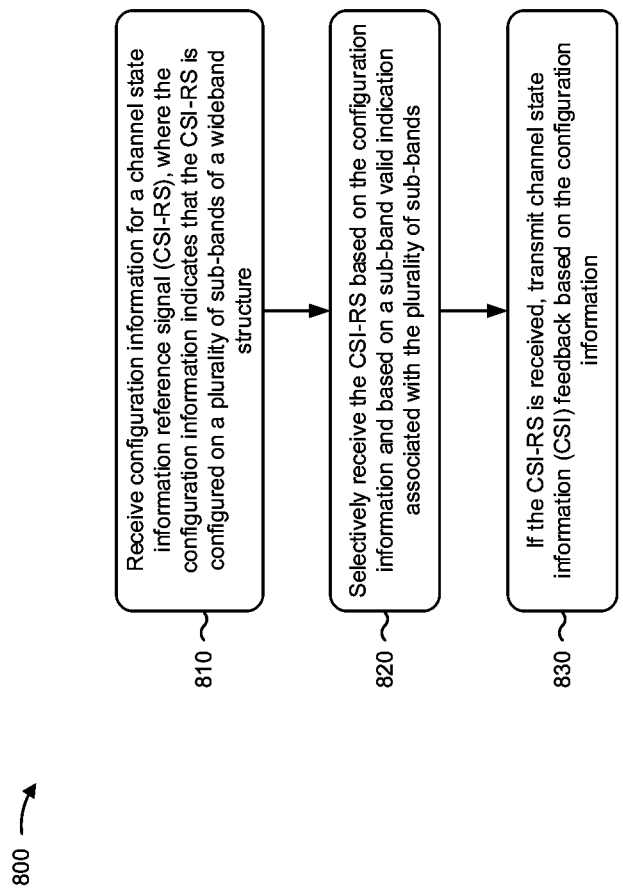
FIG. 8 is a diagram illustrating an example process performed, for example, by a UE.

The stored program codes, when executed by the controller/processor 280 or other processors and modules at the UE 120, may cause the UE 120 to perform operations described with respect to the process 800 of FIG. 8 or other processes as described herein. The stored program codes, when executed by the controller/processor 240 or other processors and modules at the base station 110, may cause the base station 110 to perform operations described with respect to process 900 of FIG. 9 or other processes as described herein. A scheduler 246 may schedule UEs for data transmission on the downlink, the uplink, or a combination thereof.

The UE 120 may include means for performing one or more operations described herein, such as the process 800 of FIG. 8 or other processes as described herein. In some aspects, such means may include one or more components of UE 120 described in connection with FIG. 2. The base station 110 may include means for performing one or more operations described herein, such as the process 900 of FIG. 9 or other processes as described herein. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
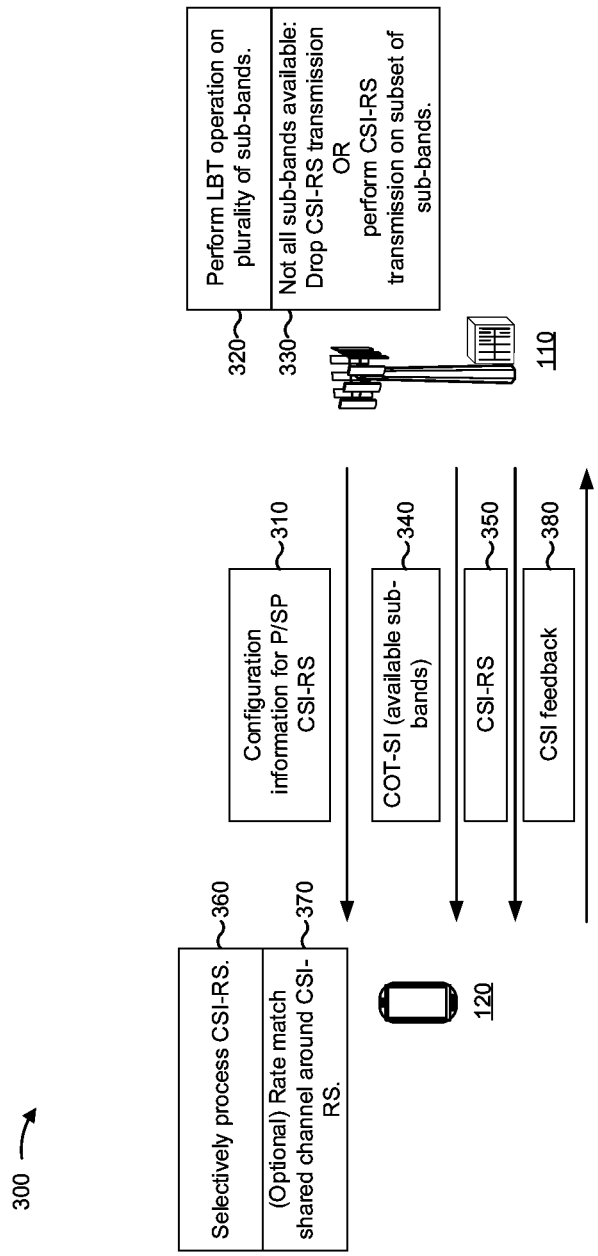
FIG. 3 is a diagram illustrating an example of a wideband channel state information reference signal (CSI-RS) configuration for a periodic or semi-persistent CSI-RS.

FIG. 3 is a diagram illustrating an example 300 of a wideband channel state information (CSI) reference signal (RS) configuration for a periodic or semi-persistent CSI-RS. While FIG. 3 includes a single UE 120 and a single BS 110, the operations described in connection with FIG. 3 may be performed by any two or more wireless nodes. Furthermore, the BS 110 may perform the operations described herein for a group of UEs 120, such as UEs 120 in communication with the BS 110.

As shown by reference number 310, the BS 110 may transmit configuration information. For example, the configuration information may identify a CSI-RS configuration, such as for a periodic CSI-RS (P-CSI-RS) or a semi-persistent CSI-RS (SP-CSI-RS). In some aspects, the CSI-RS may be an aperiodic CSI-RS (A-CSI-RS), which is described in more detail in connection with FIG. 4. In some aspects, the configuration information may include, for example, information indicating a resource allocation of the CSI-RS, information indicating a sequence used to generate the CSI-RS, or further examples. For example, the configuration information may identify a group of sub-bands on which the CSI-RS may be transmitted and on which the UE 120 is to process the CSI-RS. In some aspects, the UE 120 may determine the group of sub-bands based on a configuration of the UE 120, such as a bandwidth part configuration of the UE 120. In some aspects, the configuration information may include information indicating a power scaling configuration for the CSI-RS, which is described in more detail below.

In some aspects, the UE 120 may receive a grant for a shared channel, such as a physical downlink shared channel (PDSCH). The grant may be received on one or more sub-bands that are available for the CSI-RS, since the BS 110 may not grant resources on an unavailable sub-band. Thus, the UE 120 may determine which sub-bands are available sub-bands based on the grant. The UE 120 may rate match the shared channel around CSI-RS resources, as described in more detail below.

As shown by reference number 320, the BS 110 may perform an LBT operation on a group of sub-bands. For example, the BS 110 may perform the LBT operation on sub-bands on which the CSI-RS is configured before transmitting the CSI-RS. The BS 110 may determine an LBT result for each sub-band of the group of sub-bands. The LBT result may indicate whether the corresponding sub-band is available for the CSI-RS or other communications by the BS 110. A sub-band for which LBT is performed can also be called an RB set or an LBT bandwidth. For example, the LBT result for a sub-band may indicate that the sub-band is associated with an interference level that satisfies a threshold (i.e., is lower than the threshold) or that the sub-band is not associated with another reservation in a time window associated with the CSI-RS. As one example, the threshold for the interference level may be approximately −82 decibel milliwatts (dBm) at an antenna of the BS 110. The time window of the LBT operation may be referred to as a transmit opportunity. The BS 110 may provide, to the UE 120, a sub-band valid indication that indicates the LBT result. For example, the BS 110 may provide the sub-band valid indication via DCI, medium access control signaling, or the like. A sub-band valid indication may include information indicating one or more sub-bands that are (or are not) valid for communication. For example, a sub-band valid indication may include a bitmap indicating sub-bands, LBT bandwidths, or RB sets on which communication is valid based at least in part on a channel access operation (such as based at least in part on an LBT result associated with the channel access operation).

As shown by reference number 330, in some cases, not all sub-bands, of the group of sub-bands, may be available for the CSI-RS. In this case, the BS 110 may drop or not transmit the CSI-RS, or may perform CSI-RS transmission on the available sub-bands.

In some aspects, the BS 110 may not transmit the CSI-RS when at least one sub-band, of the group of sub-bands, is unavailable for the CSI-RS. This may be referred to herein as an "all-or-nothing" approach. In the all-or-nothing approach, the BS 110 may transmit the CSI-RS when all sub-bands of the group of sub-bands are available for the CSI-RS. This may conserve signaling resources that would otherwise be used to configure or transmit a partial CSI-RS using less than all sub-bands of the group of sub-bands, and may reduce complexity of the particular design implementation. Secondly, in an all-or-nothing approach, if a CSI-RS is not transmitted in a valid sub-band (since another sub-band is not available), the CSI-RS resources can be used for data, so that the data need not rate match around the CSI-RS resources.

In some aspects, the BS 110 may transmit the CSI-RS on available sub-bands of the group of sub-bands. For example, when one sub-band is unavailable and three sub-bands are available for the CSI-RS, the BS 110 may transmit the CSI-RS on the three-sub-bands and not on the one unavailable sub-band. This may enable the provision of CSI-RSs on partially available resources, which may improve efficiency of network utilization relative to an all-or-nothing approach.

In some aspects, the BS 110 may use a sequence to generate the CSI-RS. In some aspects, the BS 110 may modify the sequence when the CSI-RS is transmitted on a subset of sub-bands of the group of bands. As a first example, the BS 110 may puncture a sequence for the group of sub-bands to generate a sequence for the subset of sub-bands. In this case, if sub-bands 0, 2, and 3 are available for the CSI-RS and sub-band 1 is unavailable, the BS 110 may puncture a sequence for sub-bands 0, 1, 2, and 3 at a location in the sequence corresponding to sub-band 1, and may generate the CSI-RS using the punctured sequence. As used herein, puncturing a sequence may refer to dropping one or more values of the sequence that correspond to an unavailable sub-band. For example, if the sequence includes 80 values and a second sub-band, of four sub-bands associated with the sequence, is unavailable, the BS 110 may drop the twenty-first through fortieth values of the sequence, may use zero values or default values for these values, or further examples. As a second example, the BS 110 may use a shortened sequence based on the number of resource elements of the CSI-RS. In this example, if the sequence includes 80 values and a second sub-band, of four sub-bands associated with the sequence, is unavailable, the BS 110 may generate the CSI-RS using a 60-symbol sequence. In the case of the shortened sequence, the UE 120 may determine sub-band usage information (using a channel occupancy time (COT) structure indicator (SI), a grant-based indication, or further examples) before the CSI-RS so that the UE 120 can determine the length of the shortened sequence. In some aspects, the UE 120 may determine the punctured sequence without determining or receiving sub-band usage information (such as by performing per-sub-band processing of the CSI-RS to determine which sub-bands are used for the CSI-RS), which may simplify processing at the UE 120.

As shown by reference number 340, the BS 110 may transmit sub-band usage information, shown here as a channel occupancy time (COT) structure indicator (SI). In some aspects, the sub-band usage information may be transmitted in another form, such as downlink control information (DCI) indicating sub-band usage, an aperiodic CSI-RS trigger, a PDSCH grant, a physical uplink shared channel grant, or further examples. The COT-SI may indicate which sub-bands of the group of sub-bands are available for the CSI-RS. For example, the COT-SI may indicate LBT results for the group of sub-bands. In some aspects, the UE 120 may receive the COT-SI in a control channel, such as a physical downlink control channel (PDCCH).

In some cases, the COT-SI may be transmitted before the CSI-RS. In such a case, the UE 120 can determine which sub-bands will be used for the CSI-RS, or whether the CSI-RS will be transmitted, before the CSI-RS's transmission time. In some aspects, the UE 120 may determine that a CSI-RS is present in a transmission opportunity if the COT-SI is received before the CSI-RS's transmission time. If the UE 120 does not receive the COT-SI before the CSI-RS's transmission time, the UE 120 may determine that no CSI-RS is expected in the transmission opportunity. In this case, if the BS 110 is unable to transmit the COT-SI before the CSI-RS's transmission time, then the BS 110 may not transmit the CSI-RS. This may conserve UE resources that would otherwise be used to store the CSI-RS while waiting for the COT-SI.

In some aspects, the COT-SI may be transmitted after the CSI-RS. In this case, the UE 120 may not know which sub-bands will be used for the CSI-RS until after the CSI-RS is received. In some aspects, the UE 120 may store the CSI-RS, and may process the CSI-RS after receiving the COT-SI. For example, the UE 120 may delay processing of the CSI-RS until after the COT-SI is received. In this case, the UE 120 may process the latest CSI-RS even if the COT-SI is not available (such as based on the COT-SI coming after the CSI-RS).

As shown by reference number 350, the BS 110 may transmit the CSI-RS. For example, the BS 110 may transmit the CSI-RS using available sub-bands of the group of sub-bands. In some aspects, the BS 110 may transmit the CSI-RS in a downlink (DL) burst, such as a synchronization signal burst. As shown by reference number 360, the UE 120 may selectively process the CSI-RS. For example, in some aspects, the UE 120 may process the CSI-RS based on determining that the CSI-RS is to be transmitted. The UE 120 may generate CSI feedback based on processing the CSI-RS.

In some aspects, the UE 120 may process the CSI-RS based on detecting a DL burst (such as before a COT-SI is received). For example, the UE 120 may individually process the CSI-RS on each sub-band of the group of sub-bands, and may validate the CSI feedback to form combined CSI feedback for the available sub-bands after the COT-SI is received. Individually processing the CSI-RS on each sub-band may be referred to as a per-sub-band processing operation. Thus, the UE 120 may process the CSI-RS before the COT-SI is received, and may subsequently generate CSI feedback for the available sub-bands. This may be more reliable than attempting to identify sub-bands on which a CSI-RS is present using measurements on the sub-bands.

In some aspects, the UE 120 may determine whether a CSI-RS is present on a sub-band based on a measurement performed by the UE 120. For example, the measurement may pertain to a threshold signal-to-noise ratio (SNR) or another threshold. The UE 120 may identify which sub-bands include a CSI-RS, and may process the CSI-RS on the sub-bands that include the CSI-RS. This may be less resource-intensive than individually processing the CSI-RS on each sub-band, and may not use the COT-SI.

In some aspects, the UE 120 or the BS 110 may determine a power level for the CSI-RS. The power level may be based on, for example, a power spectral density (PSD) or a similar value. In some aspects, the power level may be independent of the number of sub-bands available for the CSI-RS. For example, the power level may be static over time, which may conserve resources that would otherwise be used to dynamically determine the power level. In some aspects, the power level may be based on the number of sub-bands available for the CSI-RS. For example, the power level may change over time, which may provide improved CSI-RS performance across different numbers of sub-bands. In some aspects, the power level may be independent or dependent on the number of sub-bands based on whether the CSI is a periodic CSI, a semi-persistent CSI, or an aperiodic CSI.

In some aspects, the power level may be determined based on the sub-bands that are available for the CSI-RS. In some aspects, the power level may be explicitly signaled (such as by using a transmission power reduction (TPR) value relative to a nominal power level). In some aspects, the signaling may be included in the COT-SI, or may be included in the aperiodic CSI-RS trigger. In some aspects, the BS 110 may be operating on many more sub-bands than the UE 120, and the COT-SI signaling may be limited to a smaller set of sub-bands. In this case, explicit signaling of power levels may be beneficial for the BS 110 so that the power level of the CSI-RS can be adapted to the smaller set of sub-bands.

As shown by reference number 370, in some aspects, the UE 120 may rate match a shared channel around the CSI-RS. For example, if the UE 120 receives a PDSCH grant on a given sub-band, then the sub-band can be considered available for the CSI-RS, since the BS 110 would not grant a PDSCH on an unavailable sub-band. In some aspects, the UE 120 may rate match the shared channel around the CSI-RS's configured resources, irrespective of whether the CSI-RS is to be received, which may conserve resources that will otherwise be used to determine whether the CSI-RS is to be received. In some aspects, when the CSI-RS is transmitted only if all sub-bands are available, the UE 120 may rate match around the CSI-RS when all sub-bands are available for the CSI-RS. In such a case, if the sub-band usage information is not received before the CSI-RS, then the UE 120 may not decode the PDSCH or may assume that the CSI-RS is not present. In some aspects, the UE 120 may determine whether the UE 120 has received the CSI-RS based on a measurement (such as an SNR measurement or further examples), and may rate match around the CSI-RS if the UE 120 has received the CSI-RS. In some aspects, the PDSCH grant may include an indicator of whether the UE 120 is to rate match around the shared channel. For example, the indicator may include a bit that indicates whether the UE 120 is to rate match around the CSI-RS, which may conserve resources of the UE 120 that would otherwise be used to determine whether to rate match around the shared channel.

As shown by reference number 380, the UE 120 may selectively transmit CSI feedback to the BS 110. For example, the UE 120 may transmit the CSI feedback when the UE 120 has determined the CSI feedback based on receiving a CSI-RS from the BS 110. If no CSI-RS is received, or if the UE 120 determines that a CSI-RS is not to be received, the UE 120 may not determine or transmit CSI feedback.

Figure 4:
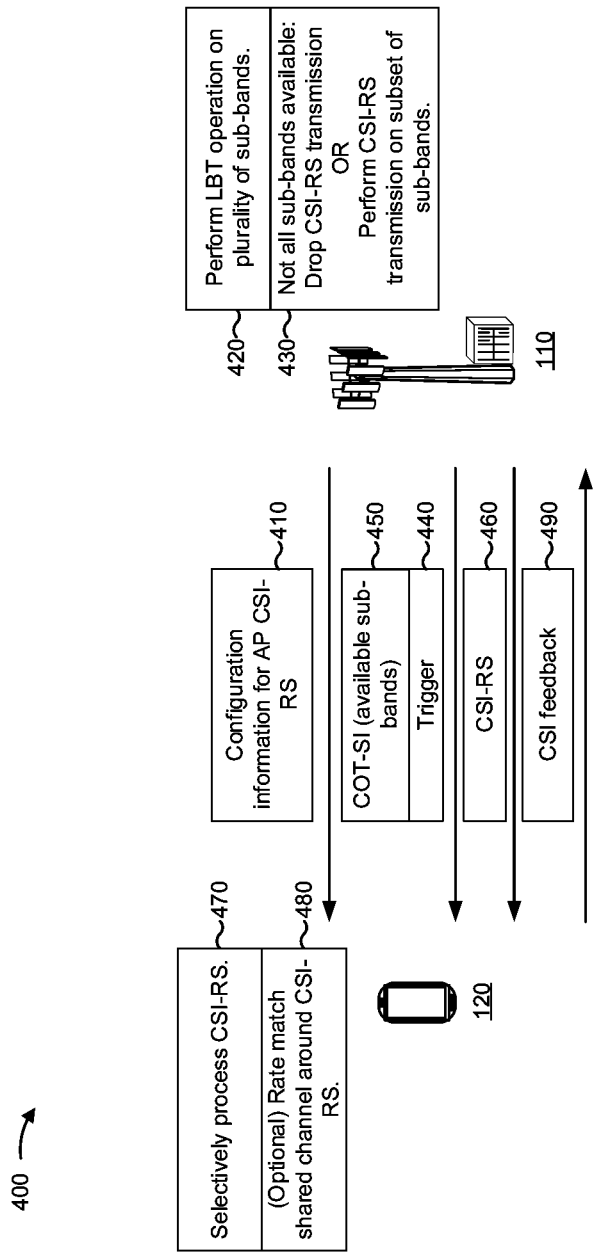
FIG. 4 is a diagram illustrating an example of a wideband CSI-RS configuration for an aperiodic CSI-RS.

FIG. 4 is a diagram illustrating an example 400 of a wideband CSI-RS configuration for an aperiodic CSI-RS. While FIG. 4 includes a single UE 120 and a single BS 110, the operations described in connection with FIG. 4 may be performed by any two or more wireless nodes. Furthermore, the BS 110 may perform the operations described herein for a group of UEs 120, such as several UEs 120 in communication with the BS 110.

As shown by reference number 410, the BS 110 may transmit configuration information for an aperiodic CSI-RS (sometimes abbreviated A-CSI-RS). The configuration information is described in more detail above in connection with FIG. 3. An aperiodic CSI-RS may be associated with aperiodic CSI. The BS 110 may configure the UE 120 with one or more aperiodic CSI-RS occasions, and may indicate when the UE 120 is to determine and transmit CSI feedback using a trigger, described below. The UE 120 may not process a CSI-RS or transmit CSI feedback for a CSI-RS resource unless the UE 120 receives the trigger from the BS 110.

In some aspects, the UE 120 may receive multiple, different CSI-RS configurations. For example, the UE 120 may receive a respective CSI-RS configuration for multiple, different sub-band combinations selected from the group of sub-bands. In this case, the trigger, described below, may correspond to a CSI-RS configuration that is to be used (such as a CSI-RS configuration corresponding to the set of available sub-bands for the CSI-RS). As an example, for 4 sub-bands, there may be 15 CSI-RS configurations.

As shown by reference number 420, the BS 110 may perform an LBT operation on a group of sub-bands. This is described in more detail in connection with FIG. 3. As shown by reference number 430, in some cases, not all sub-bands, of the group of sub-bands, may be available for the CSI-RS. In this case, the BS 110 may drop or not transmit the CSI-RS, or may perform CSI-RS transmission on the available sub-band(s). When the BS 110 determines that CSI-RS transmission is to be performed on the available sub-band(s), the BS 110 may transmit a trigger for the CSI-RS, as shown by reference number 440.

In some aspects, the BS 110 may transmit the trigger based on the LBT result indicating that all sub-bands of the group of sub-bands are available. This may conserve resources that would otherwise be used to provide sub-band usage information to the UE 120, since the UE 120 will not receive a trigger unless all sub-bands are available for the CSI-RS.

In some aspects, the BS 110 may transmit the trigger when a subset of sub-bands of the group of sub-bands are available. For example, the BS 110 may transmit the trigger when less than all sub-bands, of the group of sub-bands, are available for the CSI-RS. In some aspects, the BS 110 may transmit the trigger after transmitting the sub-band usage information shown by reference number 450, and the UE 120 may determine which sub-bands contain the CSI-RS using the sub-band usage information. In this case, the BS 110 may provide a gap between the trigger and the sub-band usage information that is sufficient for the UE 120 to decode the sub-band usage information. This may be based on UE capabilities or other information regarding the UE 120.

In some aspects, the trigger may include information indicating which sub-bands are available for the CSI-RS. For example, the configuration information shown by reference number 410 may configure some CSI-RS parameters, and the trigger may indicate a bandwidth of the CSI-RS, a set of sub-bands used for the CSI-RS, or further examples. Thus, the BS 110 may indicate which sub-bands are to be used for the CSI-RS using the trigger, which conserves resources that would otherwise be used to transmit a COT-SI.

As shown by reference number 460, the BS 110 may transmit the CSI-RS. In some aspects, the BS 110 may generate the CSI-RS based on a sequence, as is described in more detail in connection with FIG. 3. For example, the sequence may be punctured for unavailable sub-bands, or may be shortened for unavailable sub-bands, as is also described in more detail in connection with FIG. 3.

As shown by reference number 470, the UE 120 may selectively process the CSI-RS, as described in more detail above in connection with FIG. 3. As shown by reference number 480, the UE 120 may rate match a shared channel around the CSI-RS. As shown by reference number 490, the UE 120 may selectively transmit CSI feedback to the BS 110. These operations are also described in more detail in connection with FIG. 3.

Figure 5:
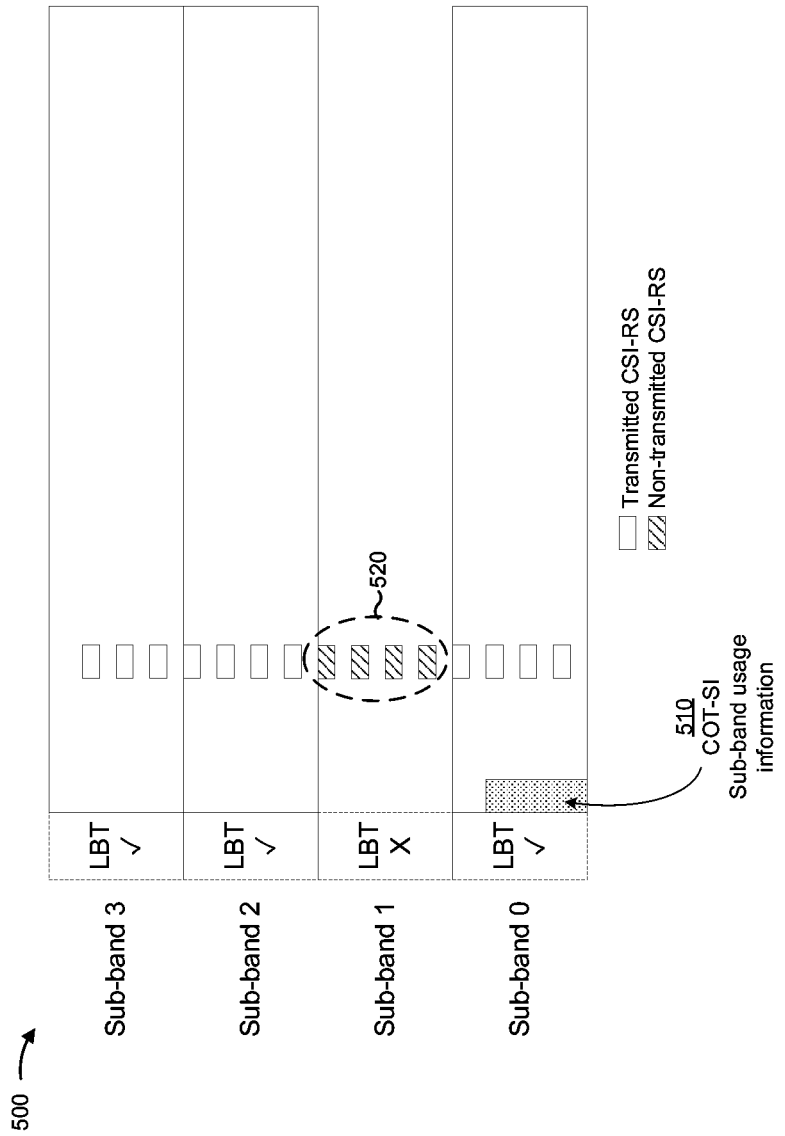
FIG. 5 is a diagram illustrating an example of a CSI-RS configuration in which a CSI-RS is transmitted on available sub-bands and not on unavailable sub-bands.

FIG. 5 is a diagram illustrating an example 500 of a CSI-RS configuration in which a CSI-RS is transmitted on available sub-bands and not on unavailable sub-bands. As shown, example 500 includes Sub-bands 0 through 3. As further shown, Sub-bands 0, 2, and 3 are available and Sub-band 1 is unavailable. The COT-SI for example 500 is shown by reference number 510. The COT-SI may indicate that Sub-bands 0, 2, and 3 are available and Sub-band 1 is unavailable. In some aspects, the COT-SI may be configured to be transmitted before the CSI-RS, as described elsewhere herein. For example, the CSI-RS may not be transmitted unless the CSI-RS is preceded by the COT-SI, thereby enabling the UE 120 to determine which sub-bands are available for the CSI-RS. As shown by reference number 520, the BS 110 may not transmit the CSI-RS in Sub-band 1. Furthermore, the BS 110 may transmit the CSI-RS in Sub-bands 0, 2, and 3.

Figure 6:
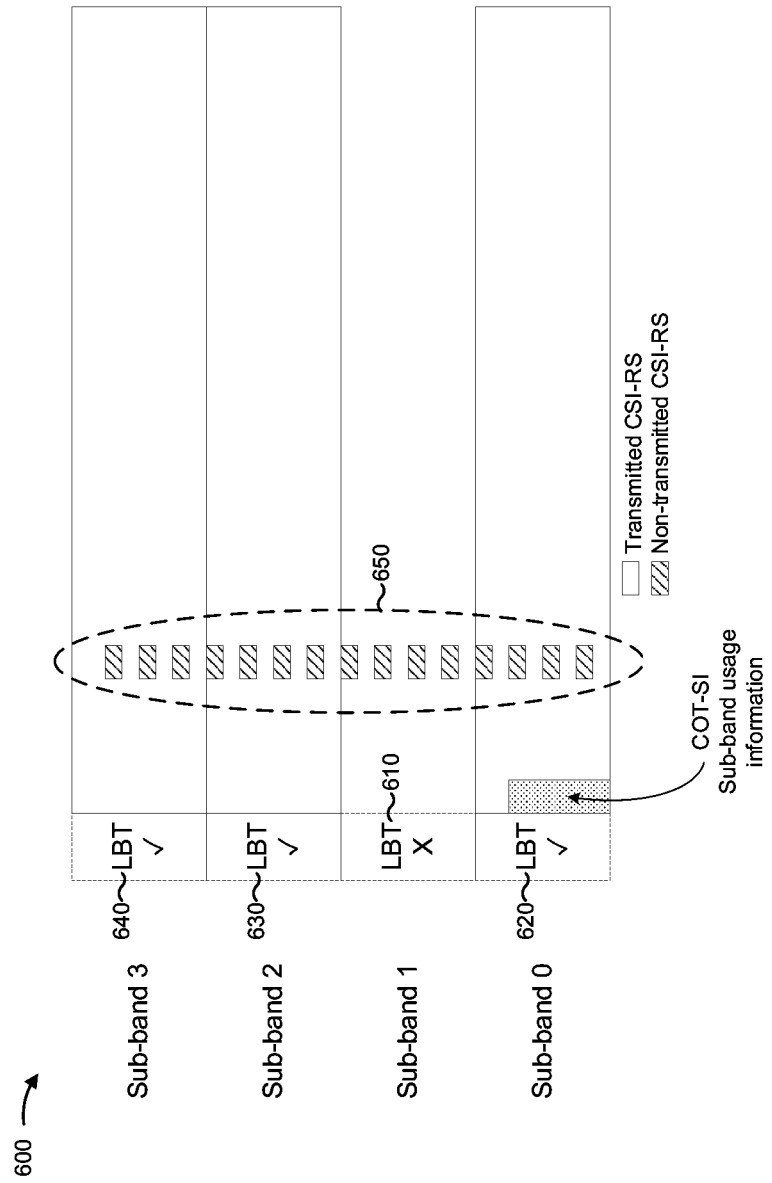
FIG. 6 is a diagram illustrating an example of a CSI-RS configuration in which a CSI-RS is not transmitted when any sub-band is unavailable.

FIG. 6 is a diagram illustrating an example 600 of a CSI-RS configuration in which a CSI-RS is not transmitted when any sub-band is unavailable. As shown in FIG. 6, the CSI-RS is not transmitted on any sub-band based on Sub-band 1 being unavailable. For example, reference number 610 shows that the LBT operation has failed in Sub-band 1, and reference numbers 620, 630, and 640 show that the LBT operation has succeeded in Sub-bands 0, 2, and 3, respectively. Since the LBT operation failed in at least one of the sub-bands shown in example 600, the CSI-RS is not transmitted on any of the four sub-bands, as shown by reference number 650. This implementation is referred to as the all-or-nothing approach.

Figure 7:
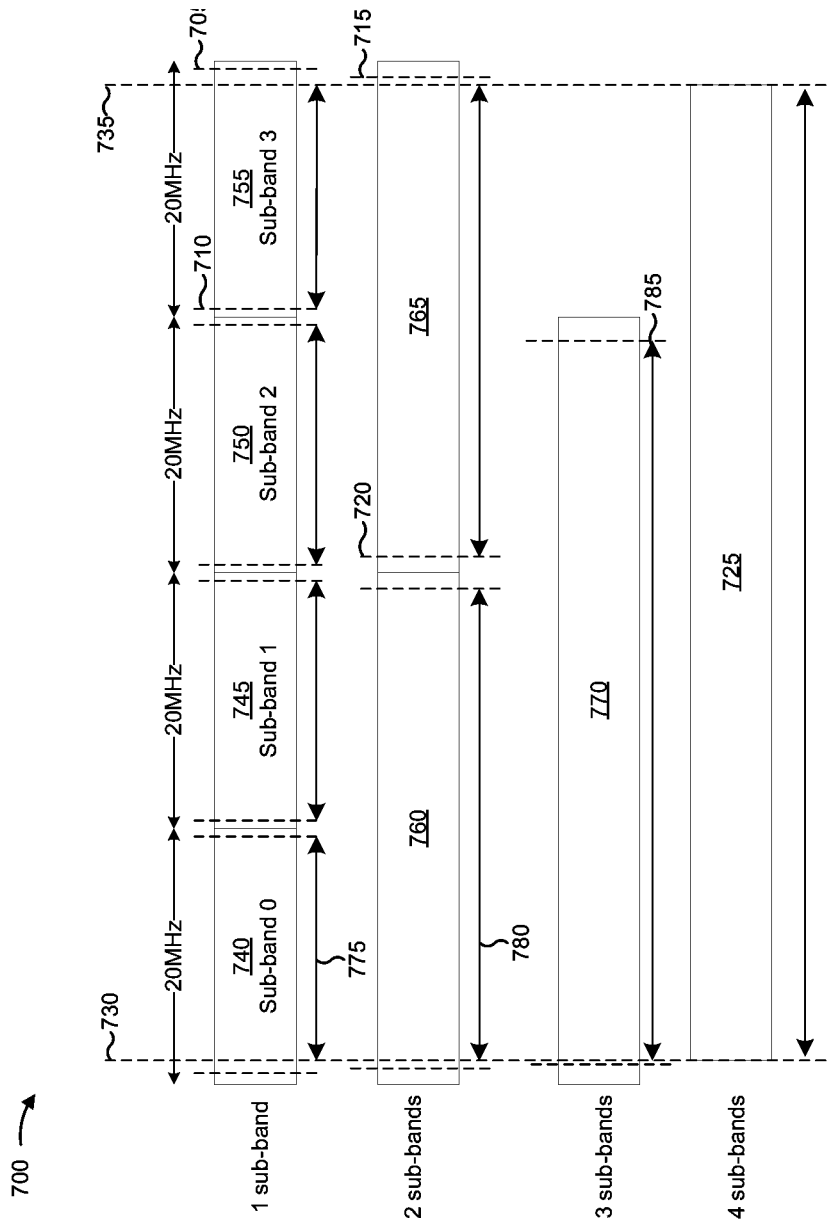
FIG. 7 is a diagram illustrating an example of resource element selection for a wideband CSI-RS.

FIG. 7 is a diagram illustrating an example 700 of resource element selection for a wideband CSI-RS. A transmitter may enforce a guard band for a bandwidth, meaning that resource elements at the edge of the bandwidth are not usable by the transmitter based on regulatory rules. This may reduce interference and help to manage the power spectral density (PSD) of the air interface. The width of the guard band may be based on a bandwidth of the channel. For example, a wider bandwidth may be associated with wider guard bands. In example 700 generally, each rectangle corresponds to a sub-band or a wideband structure composed of multiple sub-bands. Guard bands are indicated by dashed lines, where the area between a dashed line and the edge of the sub-band is the guard band. For example, the guard bands for Sub-band 3 are between the dashed lines shown by reference numbers 705 and 710 and the respective edges of Sub-band 3, and the guard bands for a 40 MHz wideband structure formed from Sub-bands 2 and 3 are between the dashed lines shown by reference numbers 715 and 720 and the respective outer edges of Sub-bands 2 and 3. It can be seen that the guard bands for the 40 MHz wideband structure are wider than for the 20 MHz wideband structure.

The CSI-RS described in connection with FIGS. 3-6 may be based on a sequence associated with the 80 MHz wideband structure shown by reference number 725. More generally, the CSI-RS for a group of sub-bands may be based on a sequence associated with a widest bandwidth structure that can be formed using the group of sub-bands. However, the guard bands for the smaller bandwidths, such as those shown by 705 through 720, may be smaller than for the wideband structure 725. This may mean that some resource elements of the smaller bandwidths or the intermediate bandwidths (such as 40 MHz and 60 MHz) fall outside of the usable region of the wideband structure, which reduces flexibility and which may lead to non-conformant transmission if such resource elements are used for the CSI-RS on the wideband structure.

The BS 110 may use resource elements that are usable for the wideband structure shown by reference number 725, irrespective of which set of sub-bands is actually used for the CSI-RS. In other words, the BS 110 may use resource elements of the set of sub-bands that intersect with the resource elements of the wideband structure 725, and may truncate resource elements that do not intersect with the resource elements of the wideband structure. Referring now to FIG. 7, the guard bands of the wideband structure 725 are shown by reference numbers 730 and 735. Thus, the smaller-bandwidth sets of sub-bands, shown by reference numbers 740, 745, 750, 755, 760, 765, and 770, do not use resource elements in the guard bands of the wideband structure. The bandwidth of the usable resource elements for the 20 MHz bandwidth Sub-band 0 740 in this configuration is shown by reference number 775. It can be seen that the left side of Sub-band 0 740's bandwidth ends at the guard band 730 of the wideband structure rather than at the guard band for the 20 MHz bandwidth. In some examples, such as for a 30 kHz subcarrier spacing, the number of usable resource elements of Sub-band 0 may be 48×12 resource elements, or 48 resource blocks. In some other examples, the number of usable resource elements for the sub-bands may be 48×12 resource elements, or 48 resource blocks, so as to make each of the sub-bands identical. Similar illustrations of bandwidth for the 40 MHz bandwidth and the 60 MHz bandwidth are shown by reference numbers 780 and 785, respectively. Thus, by confining the resource elements of the smaller bandwidths to those that intersect with resource elements within the usable bandwidth of the wideband structure 725, the CSI-RS sequence can be mapped more simply to the smaller bandwidths, since the same sequence can be used for a given resource element in the sub-band case and in the wideband structure case.

FIG. 8 is a diagram illustrating an example process 800 performed, for example, by a UE. The process 800 shows where a UE (such as UE 120) performs operations associated with CSI feedback for wideband operation.

As shown in FIG. 8, in some aspects, the process 800 may include receiving configuration information for a channel state information reference signal (CSI-RS), where the configuration information indicates that the CSI-RS is configured on a plurality of sub-bands of a wideband structure (block 810). For example, the UE or an interface of the UE (using antenna 252, DEMOD 254, MIMO detector 256, receive processor 258, controller/processor 280) may receive configuration information for a CSI-RS. The configuration information may indicate that the CSI-RS is configured on a plurality of sub-bands of a wideband structure.

As shown in FIG. 8, in some aspects, the process 800 may include selectively receiving the CSI-RS based on the configuration information and based on a sub-band valid indication associated with the plurality of sub-bands (block 820). For example, the UE or an interface of the UE (such as using antenna 252, DEMOD 254, MIMO detector 256, receive processor 258, or controller/processor 280) may selectively receive the CSI-RS based on the configuration information and based on a sub-band valid indication associated with the plurality of sub-bands.

As shown in FIG. 8, in some aspects, the process 800 may include, if the CSI-RS is received, transmitting channel state information (CSI) feedback based on the configuration information (block 830). For example, if the CSI-RS is received, the UE or an interface of the UE (using antenna 252, DEMOD 254, MIMO detector 256, receive processor 258, controller/processor 280) may transmit channel state information (CSI) feedback based on the configuration information.

The process 800 may include additional aspects, such as any single aspect or any combination of aspects described below or in connection with one or more other processes described elsewhere herein.

In a first aspect, the process 800 may include receiving downlink control information indicating the sub-band valid indication.

In a second aspect, alone or in combination with the first aspect, when all sub-bands of the plurality of sub-bands are available for the CSI-RS, the CSI-RS is received, and when at least one sub-band of the plurality of sub-bands is not available for the CSI-RS, the CSI-RS is not received.

In a third aspect, alone or in combination with one or more of the first and second aspects, the process 800 may include rate matching a shared channel around a resource of the CSI-RS irrespective of whether the CSI-RS is received.

In a fourth aspect, alone or in combination with one or more of the first through third aspects, the process 800 may include performing a processing operation associated with the CSI-RS with respect to the plurality of sub-bands irrespective of whether the CSI-RS is received.

In a fifth aspect, alone or in combination with one or more of the first through fourth aspects, the process 800 may include determining that the CSI-RS is to be received based on sub-band usage information received before a resource associated with the CSI-RS; and performing a processing operation associated with the CSI-RS with respect to the plurality of sub-bands based on determining that the CSI-RS is to be received.

In a sixth aspect, alone or in combination with one or more of the first through fifth aspects, the CSI-RS is received on a subset of sub-bands of the plurality of sub-bands based on the subset of sub-bands being available for the CSI-RS.

In a seventh aspect, alone or in combination with one or more of the first through sixth aspects, a sequence for the CSI-RS for the plurality of sub-bands is punctured to generate the CSI-RS for the subset of sub-bands.

In an eighth aspect, alone or in combination with one or more of the first through seventh aspects, In some implementations, the CSI-RS for the subset of sub-bands is generated based on a shortened sequence relative to a sequence for the CSI-RS for the plurality of sub-bands.

In a ninth aspect, alone or in combination with one or more of the first through eighth aspects, the process 800 may include receiving a trigger for the CSI feedback based on all sub-bands, of the plurality of sub-bands, being available for the CSI-RS.

In a tenth aspect, alone or in combination with one or more of the first through ninth aspects, when the CSI-RS is received on a subset of sub-bands, of the plurality of sub-bands, the CSI-RS is received on resource elements on the subset of sub-bands that correspond to a widest bandwidth of the wideband structure.

In an eleventh aspect, alone or in combination with one or more of the first through tenth aspects, the CSI-RS is generated based on a same sequence with respect to the widest bandwidth and with respect to the subset of sub-bands.

In a twelfth aspect, alone or in combination with one or more of the first through eleventh aspects, the CSI-RS spans 48 resource blocks in a sub-band of the subset of sub-bands.

In a thirteenth aspect, alone or in combination with one or more of the first through twelfth aspects, the resource elements intersect with resource elements of the wideband structure.

In a fourteenth aspect, alone or in combination with one or more of the first through thirteenth aspects, the process 800 may include receiving a trigger for the CSI feedback after a COT-SI indicating a subset of sub-bands, of the plurality of sub-bands, that are available for the CSI-RS.

In a fifteenth aspect, alone or in combination with one or more of the first through fourteenth aspects, the CSI-RS is for periodic or semi-persistent CSI feedback.

In a sixteenth aspect, alone or in combination with one or more of the first through fifteenth aspects, the CSI-RS is for aperiodic CSI feedback.

In a seventeenth aspect, alone or in combination with one or more of the first through sixteenth aspects, the process 800 may include rate matching a shared channel around a resource of the CSI-RS based on the plurality of sub-bands being available for the CSI-RS.

In an eighteenth aspect, alone or in combination with one or more of the first through seventeenth aspects, the process 800 may include selectively receiving the CSI-RS based on at least one of: a COT-SI received before a resource of the CSI-RS, a signal-to-noise ratio associated with a resource of the CSI-RS, or a value associated with a grant for a shared channel.

In a nineteenth aspect, alone or in combination with one or more of the first through eighteenth aspects, the process 800 may include performing a processing operation associated with the CSI-RS with respect to the plurality of sub-bands based on a COT-SI received after the CSI-RS is received.

In a twentieth aspect, alone or in combination with one or more of the first through nineteenth aspects, the process 800 may include performing a per-sub-band processing operation associated with the CSI-RS to determine per-sub-band CSI feedback; and identifying a subset of sub-bands, of the plurality of sub-bands, on which the CSI-RS is received, where the CSI feedback is based on the per-sub-band CSI feedback associated with the subset of sub-bands.

In a twenty-first aspect, alone or in combination with one or more of the first through twentieth aspects, the process 800 may include receiving a grant for a subset of sub-bands of the plurality of sub-bands; and rate matching a shared channel associated with the grant around a resource associated with the CSI-RS on the subset of sub-bands.

In a twenty-second aspect, alone or in combination with one or more of the first through twenty-first aspects, the process 800 may include receiving a grant for a subset of sub-bands of the plurality of sub-bands; and rate matching a shared channel associated with the grant around a resource associated with the CSI-RS on the subset of sub-bands based on a COT-SI being received before the CSI-RS, where the COT-SI indicates that the subset of sub-bands are available.

In a twenty-third aspect, alone or in combination with one or more of the first through twenty-second aspects, the CSI-RS is received on a subset of sub-bands.

In a twenty-fourth aspect, alone or in combination with one or more of the first through twenty-third aspects, the configuration information includes configurations for multiple different subsets of sub-bands of the plurality of sub-bands.

In a twenty-fifth aspect, alone or in combination with one or more of the first through twenty-fourth aspects, the process 800 may include receiving a trigger associated with a configuration for a particular subset of sub-bands, of the multiple different subsets of sub-bands, based on the particular subset of sub-bands being available for the CSI-RS.

In a twenty-sixth aspect, alone or in combination with one or more of the first through twenty-fifth aspects, the process 800 may include receiving a trigger that indicates a particular subset of sub-bands, of the multiple different subsets of sub-bands, based on the particular subset of sub-bands being available for the CSI-RS.

In a twenty-seventh aspect, alone or in combination with one or more of the first through twenty-sixth aspects, a power level of the CSI-RS, per resource element or per sub-band, is independent of a number of sub-bands on which the CSI-RS is transmitted.

In a twenty-eighth aspect, alone or in combination with one or more of the first through twenty-seventh aspects, a power level of the CSI-RS, per resource element or per sub-band, is based on a number or configuration of sub-bands on which the CSI-RS is transmitted.

In a twenty-ninth aspect, alone or in combination with one or more of the first through twenty-eighth aspects, a power level of the CSI-RS is based on whether the CSI-RS is aperiodic, periodic, or semi-persistent.

In a thirtieth aspect, alone or in combination with one or more of the first through twenty-ninth aspects, the process 800 may include determining a power level of the CSI-RS based on at least one of: a number or configuration of sub-bands on which the CSI-RS is transmitted, or information indicating the power level of the CSI-RS.

Although FIG. 8 shows example blocks of the process 800, in some aspects, the process 800 may include additional blocks, fewer blocks, different blocks, or differently arranged blocks than those depicted in FIG. 8. Additionally, or alternatively, two or more of the blocks of the process 800 may be performed in parallel.

Figure 9:
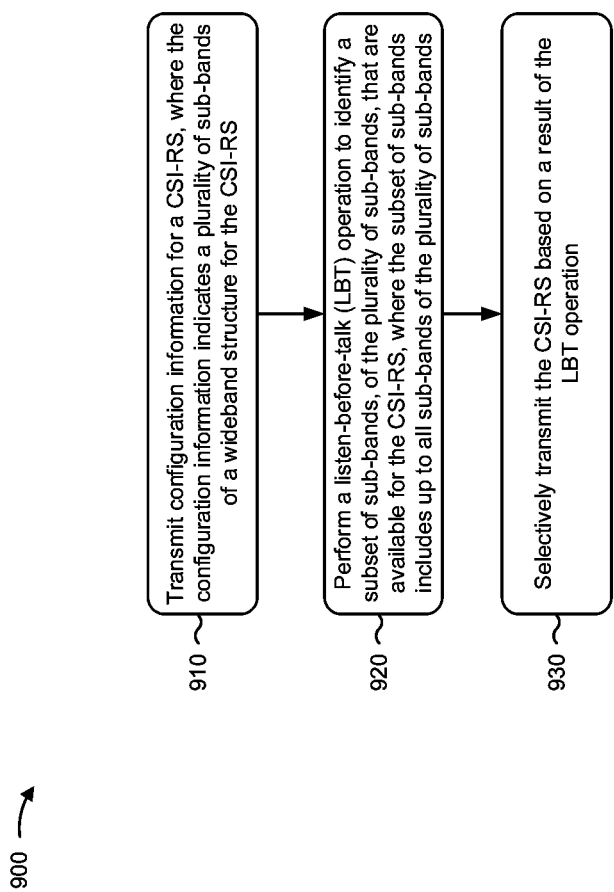
FIG. 9 is a diagram illustrating an example process performed, for example, by a BS.

FIG. 9 is a diagram illustrating an example process 900 performed, for example, by a BS. The process 900 shows where a base station, such as base station 110, performs operations associated with CSI-RS transmission on a wideband structure.

As shown in FIG. 9, in some aspects, the process 900 may include transmitting configuration information for a CSI-RS, where the configuration information indicates a plurality of sub-bands of a wideband structure for the CSI-RS (block 910). For example, the base station or an interface of the base station (using controller/processor 240, transmit processor 220, TX MIMO processor 230, MOD 232, antenna 234) may transmit configuration information for a CSI-RS. In some aspects, the configuration information indicates a plurality of sub-bands of a wideband structure for the CSI-RS.

As shown in FIG. 9, in some aspects, the process 900 may include performing a listen-before-talk (LBT) operation to identify a subset of sub-bands, of the plurality of sub-bands, that are available for the CSI-RS, where the subset of sub-bands includes up to all sub-bands of the plurality of sub-bands (block 920). For example, the base station or an interface of the base station (using antenna 234, DEMOD 232, MIMO detector 236, receive processor 238, controller/processor 240) may perform an LBT operation to identify a subset of sub-bands, of the plurality of sub-bands, that are available for the CSI-RS. The subset of sub-bands includes up to all sub-bands of the plurality of sub-bands.

As shown in FIG. 9, in some aspects, the process 900 may include selectively transmitting the CSI-RS based on a result of the LBT operation (block 930). For example, the base station or an interface of the base station (using controller/processor 240, transmit processor 220, TX MIMO processor 230, MOD 232, antenna 234) may selectively transmit the CSI-RS based on a result of the LBT operation, as described above.

The process 900 may include additional aspects, such as any single aspect or any combination of aspects described below or in connection with one or more other processes described elsewhere herein.

In a first aspect, when all sub-bands of the plurality of sub-bands are available for the CSI-RS, the CSI-RS is transmitted, and when at least one sub-band of the plurality of sub-bands is not available for the CSI-RS, the CSI-RS is not transmitted.

In a second aspect, alone or in combination with the first aspect, the process 900 may include rate matching a shared channel around a resource of the CSI-RS irrespective of whether the CSI-RS is transmitted.

In a third aspect, alone or in combination with one or more of the first and second aspects, the subset of sub-bands includes less than all sub-bands of the plurality of sub-bands.

In a fourth aspect, alone or in combination with one or more of the first through third aspects, a sequence for the CSI-RS for the plurality of sub-bands is punctured to generate the CSI-RS for the subset of sub-bands.

In a fifth aspect, alone or in combination with one or more of the first through fourth aspects, the CSI-RS for the subset of sub-bands is generated based on a shortened sequence, relative to a sequence for the CSI-RS for the plurality of sub-bands.

In a sixth aspect, alone or in combination with one or more of the first through fifth aspects, the process 900 may include transmitting a trigger for CSI feedback associated with the CSI-RS based on all sub-bands, of the plurality of sub-bands, being available for the CSI-RS.

In a seventh aspect, alone or in combination with one or more of the first through sixth aspects, when the CSI-RS is transmitted on the subset of sub-bands of the plurality of sub-bands, the CSI-RS is transmitted on resource elements on the subset of sub-bands that correspond to a widest bandwidth of the wideband structure.

In an eighth aspect, alone or in combination with one or more of the first through seventh aspects, the CSI-RS is based on a same sequence with respect to the widest bandwidth and with respect to the subset of sub-bands.

In a ninth aspect, alone or in combination with one or more of the first through eighth aspects, the CSI-RS spans 48 resource blocks in a sub-band of the subset of sub-bands.

In a tenth aspect, alone or in combination with one or more of the first through ninth aspects, the resource elements intersect with resource elements of the wideband structure.

In an eleventh aspect, alone or in combination with one or more of the first through tenth aspects, the CSI-RS is for periodic or semi-persistent CSI feedback.

In a twelfth aspect, alone or in combination with one or more of the first through eleventh aspects, the CSI-RS is for aperiodic CSI feedback.

In a thirteenth aspect, alone or in combination with one or more of the first through twelfth aspects, the process 900 may include rate matching a shared channel around a resource of the CSI-RS based on the plurality of sub-bands being available for the CSI-RS.

In a fourteenth aspect, alone or in combination with one or more of the first through thirteenth aspects, the process 900 may include transmitting sub-band usage information identifying the subset of sub-bands, where the sub-band usage information identifying the subset of sub-bands is associated with at least one of: a COT-SI transmitted before a resource of the CSI-RS, a value associated with a grant for a shared channel, or downlink control information that indicates the subset of sub-bands.

In a fifteenth aspect, alone or in combination with one or more of the first through fourteenth aspects, the process 900 may include transmitting a grant for the subset of sub-bands; and rate matching a shared channel associated with the grant around a resource associated with the CSI-RS on the subset of sub-bands.

In a sixteenth aspect, alone or in combination with one or more of the first through fifteenth aspects, the process 900 may include transmitting a grant for the subset of sub-bands; transmitting a COT-SI before the CSI-RS; and rate matching a shared channel associated with the grant around a resource associated with the CSI-RS on the subset of sub-bands based on the COT-SI being transmitted before the CSI-RS.

In a seventeenth aspect, alone or in combination with one or more of the first through sixteenth aspects, the process 900 may include transmitting a trigger for CSI feedback associated with the CSI-RS after a COT-SI indicating the subset of sub-bands, of the plurality of sub-bands, that are available for the CSI-RS.

In an eighteenth aspect, alone or in combination with one or more of the first through seventeenth aspects, the configuration information includes configurations for multiple different subsets of sub-bands of the plurality of sub-bands.

In a nineteenth aspect, alone or in combination with one or more of the first through eighteenth aspects, the process 900 may include transmitting a trigger associated with a configuration for a particular subset of sub-bands, of the multiple different subsets of sub-bands, based on the particular subset of sub-bands being available for the CSI-RS.

In a twentieth aspect, alone or in combination with one or more of the first through nineteenth aspects, the process 900 may include transmitting a trigger that indicates a particular subset of sub-bands, of the multiple different subsets of sub-bands, based on the particular subset of sub-bands being available for the CSI-RS.

In a twenty-first aspect, alone or in combination with one or more of the first through twentieth aspects, a power level of the CSI-RS, per resource element or per sub-band, is independent of a number of sub-bands on which the CSI-RS is transmitted.

In a twenty-second aspect, alone or in combination with one or more of the first through twenty-first aspects, a power level of the CSI-RS, per resource element or per sub-band, is based on a number or configuration of sub-bands on which the CSI-RS is transmitted.

In a twenty-third aspect, alone or in combination with one or more of the first through twenty-second aspects, a power level of the CSI-RS, per resource element or per sub-band, is based on whether the CSI-RS is aperiodic, periodic, or semi-persistent.

In a twenty-fourth aspect, alone or in combination with one or more of the first through twenty-third aspects, the process 900 may include determining a power level of the CSI-RS based on at least one of: a number or configuration of sub-bands on which the CSI-RS is transmitted, or information indicating the power level of the CSI-RS.

In a twenty-fifth aspect, alone or in combination with one or more of the first through twenty-fourth aspects, the CSI-RS is transmitted when a COT-SI associated with the CSI-RS can be transmitted before the CSI-RS, and where the CSI-RS is not transmitted when the COT-SI associated with the CSI-RS cannot be transmitted before the CSI-RS.

Although FIG. 9 shows example blocks of the process 900, in some aspects, the process 900 may include additional blocks, fewer blocks, different blocks, or differently arranged blocks than those depicted in FIG. 9. Additionally, or alternatively, two or more of the blocks of the process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based on."

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a group of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:
receiving configuration information for a channel state information reference signal (CSI-RS),
wherein the configuration information indicates that the CSI-RS is configured on a plurality of sub-bands of a wideband structure;
selectively receiving the CSI-RS based on the configuration information and based on a sub-band valid indication associated with the plurality of sub-bands,
wherein, when all sub-bands of the plurality of sub-bands are available for the CSI-RS, the CSI-RS is received, and when at least one sub-band of the plurality of sub-bands is not available for the CSI-RS, the CSI-RS is not received; and
if the CSI-RS is received, transmitting channel state information (CSI) feedback based on the configuration information.

2. The method of claim 1, further comprising:
receiving downlink control information indicating the sub-band valid indication.

3. The method of claim 1, further comprising:
rate matching a shared channel around a resource of the CSI-RS irrespective of whether the CSI-RS is received.

4. The method of claim 1, further comprising:
determining that the CSI-RS is to be received based on sub-band usage information received before a resource associated with the CSI-RS; and
performing a processing operation associated with the CSI-RS with respect to the plurality of sub-bands based on determining that the CSI-RS is to be received.

5. The method of claim 1, wherein the CSI-RS is received on a subset of sub-bands of the plurality of sub-bands.

6. The method of claim 5, wherein a sequence for the CSI-RS for the plurality of sub-bands is punctured to generate the CSI-RS for the subset of sub-bands.

7. The method of claim 5, wherein the CSI-RS for the subset of sub-bands is generated based on a shortened sequence relative to a sequence for the CSI-RS for the plurality of sub-bands.

8. The method of claim 1, further comprising:
receiving a trigger for the CSI feedback based on all sub-bands, of the plurality of sub-bands, being available for the CSI-RS.

9. The method of claim 1, wherein, when the CSI-RS is received on a subset of sub-bands, of the plurality of sub-bands, the CSI-RS is received on resource elements on the subset of sub-bands that correspond to a widest bandwidth of the wideband structure.

10. The method of claim 9, wherein the CSI-RS is generated based on a same sequence with respect to the widest bandwidth and with respect to the subset of sub-bands.

11. The method of claim 9, wherein the CSI-RS spans 48 resource blocks in a sub-band of the subset of sub-bands.

12. The method of claim 9, wherein the resource elements intersect with resource elements of the wideband structure.

13. The method of claim 1, wherein the CSI-RS is for periodic or semi-persistent CSI feedback.

14. The method of claim 1, wherein the CSI-RS is for aperiodic CSI feedback.

15. A method of wireless communication performed by an apparatus of a base station, comprising:
transmitting configuration information for a channel state information reference signal (CSI-RS),
wherein the configuration information indicates a plurality of sub-bands of a wideband structure for the CSI-RS;
performing a listen-before-talk (LBT) operation to identify a subset of sub-bands, of the plurality of sub-bands, that are available for the CSI-RS,
wherein the subset of sub-bands includes up to all sub-bands of the plurality of sub-bands; and
selectively transmitting the CSI-RS based on a result of the LBT operation,
wherein, when all sub-bands of the plurality of sub-bands are available for the CSI-RS, the CSI-RS is transmitted, and when at least one sub-band of the plurality of sub-bands is not available for the CSI-RS, the CSI-RS is not transmitted.

16. The method of claim 15, further comprising:
rate matching a shared channel around a resource of the CSI-RS irrespective of whether the CSI-RS is transmitted.

17. The method of claim 15, wherein the subset of sub-bands includes less than all sub-bands of the plurality of sub-bands.

18. The method of claim 17, wherein a sequence for the CSI-RS for the plurality of sub-bands is punctured to generate the CSI-RS for the subset of sub-bands.

19. The method of claim 17, wherein the CSI-RS for the subset of sub-bands is generated based on a shortened sequence, relative to a sequence for the CSI-RS for the plurality of sub-bands.

20. The method of claim 15, further comprising:
transmitting a trigger for CSI feedback associated with the CSI-RS based on all sub-bands, of the plurality of sub-bands, being available for the CSI-RS.

21. The method of claim 15, wherein, when the CSI-RS is transmitted on the subset of sub-bands of the plurality of sub-bands, the CSI-RS is transmitted on resource elements on the subset of sub-bands that correspond to a widest bandwidth of the wideband structure.

22. The method of claim 21, wherein the CSI-RS is based on a same sequence with respect to the widest bandwidth and with respect to the subset of sub-bands.

23. The method of claim 21, wherein the CSI-RS spans 48 resource blocks in a sub-band of the subset of sub-bands.

24. The method of claim 21, wherein the resource elements intersect with resource elements of the wideband structure.

25. An apparatus of a user equipment (UE) for wireless communication, comprising:
a first interface configured to:
obtain configuration information for a channel state information reference signal (CSI-RS),
wherein the configuration information indicates that the CSI-RS is configured on a plurality of sub-bands of a wideband structure; and
selectively obtain the CSI-RS based on the configuration information and based on a sub-band valid indication associated with the plurality of sub-bands,
wherein, when all sub-bands of the plurality of sub-bands are available for the CSI-RS, the CSI-RS is obtained, and when at least one sub-band of the plurality of sub-bands is not available for the CSI-RS, the CSI-RS is not obtained; and
a second interface configured to transmit, if the CSI-RS is obtained, channel state information (CSI) feedback based on the configuration information.

26. An apparatus of a base station for wireless communication, comprising:

a first interface configured to:
  output configuration information for a channel state information reference signal (CSI-RS),
    wherein the configuration information indicates a plurality of sub-bands of a wideband structure for the CSI-RS; and
a processing system configured to:
  perform a listen-before-talk (LBT) operation to identify a subset of sub-bands, of the plurality of sub-bands, that are available for the CSI-RS,
    wherein the subset of sub-bands includes up to all sub-bands of the plurality of sub-bands,
  wherein the first interface is further configured to:
    selectively output the CSI-RS based on a result of the LBT operation,
      wherein, when all sub-bands of the plurality of sub-bands are available for the CSI-RS, the CSI-RS is outputted, and when at least one sub-band of the plurality of sub-bands is not available for the CSI-RS, the CSI-RS is not outputted.

27. A method of wireless communication performed by an apparatus of a user equipment (UE), comprising:
  receiving configuration information for a channel state information reference signal (CSI-RS),
    wherein the configuration information indicates that the CSI-RS is configured on a plurality of sub-bands of a wideband structure;
  selectively receiving the CSI-RS based on the configuration information and based on a sub-band valid indication associated with the plurality of sub-bands,
    wherein the sub-band valid indication includes information indicating one or more sub-bands, of the plurality of sub-bands, that are valid or are not valid for communication; and
  if the CSI-RS is received, transmitting channel state information (CSI) feedback based on the configuration information.

28. The method of claim 27, wherein the sub-band valid indication includes a bitmap indicating the one or more sub-bands, listen-before-talk (LBT) bandwidths, or resource block (RB) sets on which communication is valid.

29. An apparatus of a user equipment (UE) for wireless communication, comprising:
  a first interface configured to:
    obtain configuration information for a channel state information reference signal (CSI-RS),
      wherein the configuration information indicates that the CSI-RS is configured on a plurality of sub-bands of a wideband structure; and
    selectively obtain the CSI-RS based on the configuration information and based on a sub-band valid indication associated with the plurality of sub-bands,
      wherein the sub-band valid indication includes information indicating one or more sub-bands, of the plurality of sub-bands, that are valid or are not valid for communication; and
  a second interface configured to transmit, if the CSI-RS is obtained, channel state information (CSI) feedback based on the configuration information.

30. The apparatus of claim 29, wherein the sub-band valid indication includes a bitmap indicating the one or more sub-bands, listen-before-talk (LBT) bandwidths, or resource block (RB) sets on which communication is valid.

31. A method of wireless communication performed by an apparatus of a base station, comprising:
  transmitting configuration information for a channel state information reference signal (CSI-RS),
    wherein the configuration information indicates a plurality of sub-bands of a wideband structure for the CSI-RS;
  performing a listen-before-talk (LBT) operation to identify a subset of sub-bands, of the plurality of sub-bands, that are available for the CSI-RS,
    wherein the subset of sub-bands includes up to all sub-bands of the plurality of sub-bands,
    wherein a sub-band valid indication indicates a result of the LBT operation, and
    wherein the sub-band valid indication includes information indicating whether the subset of sub-bands are valid or are not valid for communication; and
  selectively transmitting the CSI-RS based on the result of the LBT operation.

32. The method of claim 31, wherein the sub-band valid indication includes a bitmap indicating the subset of sub-bands, LBT bandwidths, or resource block (RB) sets on which communication is valid.

33. An apparatus of a base station for wireless communication, comprising:
  a first interface configured to:
    output configuration information for a channel state information reference signal (CSI-RS),
      wherein the configuration information indicates a plurality of sub-bands of a wideband structure for the CSI-RS; and
  a processing system configured to:
    perform a listen-before-talk (LBT) operation to identify a subset of sub-bands, of the plurality of sub-bands, that are available for the CSI-RS,
      wherein the subset of sub-bands includes up to all sub-bands of the plurality of sub-bands,
      wherein a sub-band valid indication indicates a result of the LBT operation, and
      wherein the sub-band valid indication includes information indicating whether the subset of sub-bands are valid or are not valid for communication,
  wherein the first interface is further configured to:
    selectively output the CSI-RS based on the result of the LBT operation.

34. The apparatus of claim 33, wherein the sub-band valid indication includes a bitmap indicating the subset of sub-bands, LBT bandwidths, or resource block (RB) sets on which communication is valid.

* * * * *